(12) United States Patent
Dai

(10) Patent No.: US 10,802,339 B2
(45) Date of Patent: Oct. 13, 2020

(54) FOLDED REFLECTIVE SHEET FOR LCD BACKLIGHT MODULE

(71) Applicants: K-TRONICS (SUZHOU) TECHNOLOGY CO., LTD., Suzhou, Jiangsu (CN); BOE TECHNOLOGY GROUP CO., LTD., Beijing (CN)

(72) Inventor: Hailong Dai, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/561,217

(22) Filed: Sep. 5, 2019

(65) Prior Publication Data
US 2020/0133071 A1 Apr. 30, 2020

(30) Foreign Application Priority Data
Oct. 30, 2018 (CN) ..................... 2018 2 1772978 U

(51) Int. Cl.
*G02F 1/13357* (2006.01)
(52) U.S. Cl.
CPC .............................. *G02F 1/133605* (2013.01)
(58) Field of Classification Search
CPC ........... F21V 7/05; F21V 7/0008; F21V 7/025
See application file for complete search history.

(56) References Cited

U.S. PATENT DOCUMENTS

| | | | | |
|---|---|---|---|---|
| 1,873,310 | A * | 8/1932 | Doane ....................... | F21V 7/18 362/297 |
| 2,242,590 | A * | 5/1941 | Moreau ..................... | F21V 7/05 362/341 |
| 3,701,898 | A * | 10/1972 | McNamara, Jr. ......... | F21V 7/05 362/341 |
| 4,428,030 | A * | 1/1984 | Baliozian ................ | F21S 2/005 362/18 |
| 6,464,378 | B1 * | 10/2002 | Reed ......................... | F21V 7/10 362/297 |
| 8,622,565 | B2 * | 1/2014 | Kawada ............ | G02F 1/133608 362/97.2 |
| 8,801,235 | B2 * | 8/2014 | Yurich .................... | F21S 8/061 362/296.09 |
| 9,389,459 | B2 * | 7/2016 | Suzuki .............. | G02F 1/133605 |
| 9,696,584 | B2 * | 7/2017 | Nameda ................ | G02B 6/0055 |
| 9,841,160 | B2 * | 12/2017 | Magras-Sinnen ..... | F21V 17/007 |
| 9,872,381 | B2 * | 1/2018 | Sepkhanov .......... | H05K 1/0277 |
| 10,228,097 | B2 * | 3/2019 | Snijkers .................. | F21V 3/00 |
| 10,302,825 | B2 * | 5/2019 | Fujii ....................... | G02B 5/10 |

FOREIGN PATENT DOCUMENTS

CN 107179630 A 9/2017

* cited by examiner

*Primary Examiner* — Ismael Negron
(74) *Attorney, Agent, or Firm* — Calfee, Halter & Griswold LLP

(57) ABSTRACT

A light mixing chamber is formed by folding a reflective sheet having a central portion; at least three side portions integrated with the central portion; at least three connection portions each arranged between two side portions and integrated with a side portion of two adjacent side portions. A light source is arranged in central portion of the light mixing chamber for back illuminating a liquid crystal display panel.

18 Claims, 4 Drawing Sheets

FOLDED REFLECTIVE SHEET FOR LCD BACKLIGHT MODULE

CROSS REFERENCE TO RELATED APPLICATIONS

The present application claims the priority of Chinese patent application No. 201821772978.X filed on Oct. 30, 2018, the entire disclosure of which is incorporated herein by reference.

TECHNICAL FIELD

This disclosure relates to the field of display techniques, and in particular to a reflective sheet and a manufacture method thereof, a backlight module comprising the reflective sheet and a liquid crystal display device comprising the backlight module.

BACKGROUND

At present, backlight modules of liquid crystal display devices are generally divided into an edge type and a direct type. As compared with an edge type backlight module, a direct type backlight module requires no light guide plate, so boasting the advantages of high quality and low price, it is well received by consumers. Reflective sheet is an important component in the direct type backlight module, and the design of the reflective sheet directly influences the performances of the backlight module and the liquid crystal display device.

SUMMARY

According to an exemplary embodiment, a reflective sheet is provided, comprising: a central portion, defined by at least three fold lines, the at least three fold lines being connected sequentially and forming an enclosed shape; at least three side portions, the at least three side portions being integrated with the central portion and corresponding to the at least three fold lines one by one, wherein each side portion is bent relative to the central portion along a corresponding fold line; and at least three connection portions, each connection portion being arranged between two side portions, said each connection portion being integrated with a side portion of two adjacent side portions, being bent relative to the side portion and forming a bend line at the junction with the side portion, and said each connection portion being fixedly connected to the other side portion of the two adjacent side portions; wherein the central portion, the at least three side portions and the at least three connection portions together form a light mixing chamber.

In some exemplary embodiments, the at least three fold lines are four fold lines, the at least three side portions are four side portions, and the at least three connection portions are four connection portions; wherein the four side portions comprise two first side portions arranged oppositely in parallel with each other and extending in a first direction, and two second side portions arranged oppositely in parallel with each other and extending in a second direction, wherein the first direction is perpendicular to the second direction; wherein the four fold lines comprise two first fold lines formed between the two first side portions and the central portion, and two second fold lines formed between the two second side portions and the central portion, wherein the two first fold lines are parallel with each other and extend in the first direction, and the two second fold lines are parallel with each other and extend in the second direction, and the two first fold lines and the two second fold lines together form a rectangular or square shape; wherein each connection portion is located between a first side portion and a second side portion, and connects the first side portion and the second side portion, wherein the connection portion is integrated with the second side portion and fixedly connected to the first side portion, and the bend line is formed between the connection portion and the second side portion.

In some exemplary embodiments, the fixed connection between the connection portion and the first side portion is to bond the connection portion to the first side portion.

In some exemplary embodiments, the fixed connection between the connection portion and the first side portion is implemented by forming clamping structures in the connection portion and the first side portion.

In some exemplary embodiments, the clamping structures comprise an elastic clamping claw and a clamping hole that can be engaged with each other, wherein:
the elastic clamping claw is formed in the connection portion, and the clamping hole is formed in the first side portion; or the elastic clamping claw is formed in the first side portion, and the clamping hole is formed in the connection portion.

In some exemplary embodiments, the clamping structures comprise shape-complementary structures formed at adjacent edges of the connection portion and the first side portion.

In some exemplary embodiments, the shape-complementary structures comprise: a first sawtooth structure formed at an edge of the connection portion, and a second sawtooth structure formed at an edge of the first side portion, and the first sawtooth structure and the second sawtooth structure can be clamped with each other.

In some exemplary embodiments, the shape-complementary structures comprise: at least one protrusion portion formed at an edge of the connection portion, and at least one recess portion formed at an edge of the first side portion; or at least one recess portion formed at an edge of the connection portion, and at least one protrusion portion formed at an edge of the first side portion; wherein the protrusion portion and the recess portion are complementary in shape.

In some exemplary embodiments, at least one of the bend lines, the first fold line, and the second fold line is provided with at least one slit.

In some exemplary embodiments, the bend line intersects a corresponding vertex of the rectangle or the square.

In some exemplary embodiments, a through hole is arranged at the intersection of the bend line and the vertex.

In some exemplary embodiments, the through hole has a diameter of 3 mm-6 mm.

In some exemplary embodiments, a first line is provided on the connection portion, and a second line is provided on the second side portion, and both the first line and the second line intersect the bend line, and the first line and the second line are formed respectively by a plurality of slits arranged at intervals.

In some exemplary embodiments, the first line and the second line are arranged symmetrically with respect to the bend line.

In some exemplary embodiments, at least one of the first line and the second line has a shape selected from the following group: straight line, curve and a combination thereof.

In some exemplary embodiments, the first line and the second line are straight lines and respectively extending towards the edges of the reflective sheet, a first angle is formed between the bend line and the first line, and a second angle is formed between the bend line and the second line, the first angle and the second angle are greater than 0° and smaller than or equal to 90°.

In some exemplary embodiments, the first line and the second line are straight lines and respectively extending towards the edges of the reflective sheet, a first angle is formed between the bend line and the first line, and a second angle is formed between the bend line and the second line, the first angle and the second angle are greater than or equal to 30° and smaller than or equal to 70°.

According to another exemplary embodiment, a backlight module is provided, wherein the backlight module comprises a light source and the reflective sheet mentioned above, and the light source is arranged on the central portion of the reflective sheet and located within the light mixing chamber of the reflective sheet.

According to another exemplary embodiment, a liquid crystal display device is provided, wherein the liquid crystal display device comprises the backlight module mentioned above.

According to another exemplary embodiment, a method for manufacturing the reflective sheet mentioned above is provided, comprising: forming a cut between the connection portion and the first side portion adjacent thereto; bending the two first side portions and the two second side portions relative to the central portion; bending the connection portion relative to the second side portion; and fixedly connecting the connection portion to the first side portion adjacent thereto.

BRIEF DESCRIPTION OF DRAWINGS

Exemplary embodiments will be described in detail with reference to the drawings in order that the problems to be solved by this disclosure, the above and other objectives, features and advantages can be fully appreciated and understood, wherein.

It should be understood that the drawings are intended for explaining the exemplary embodiments, so they do not have to be drawn to scale. Throughout the drawings, same or similar parts, components and/or elements are indicated by same reference signs.

DETAILED DESCRIPTION

Figure 1:
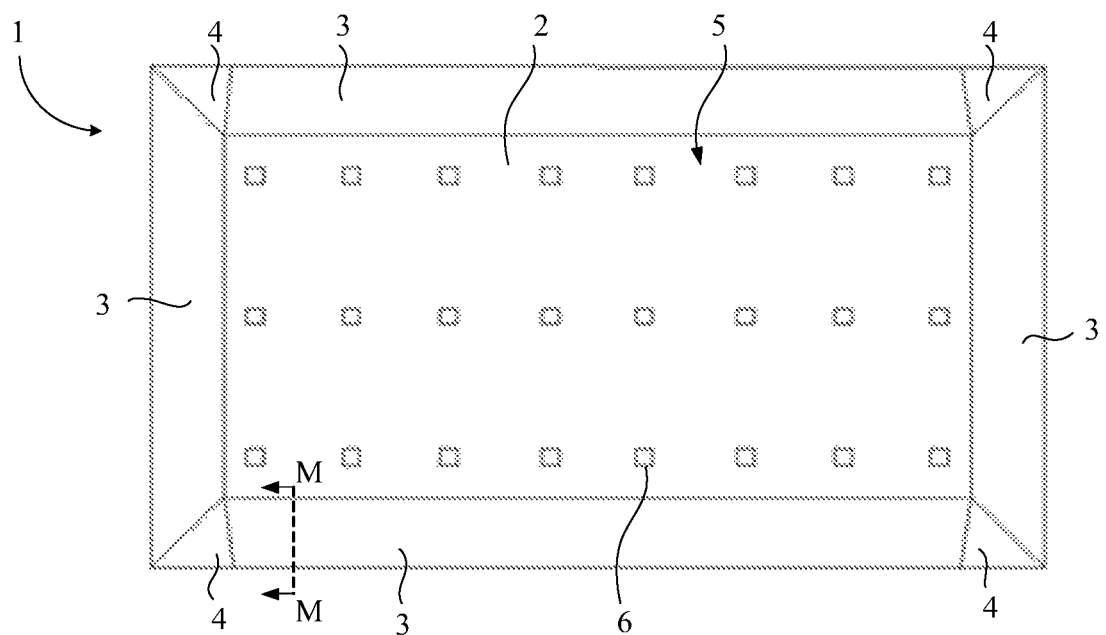
FIG. 1 is a schematic structure view of a reflective sheet in the prior art.

The technical solutions in the exemplary embodiments will be described clearly and completely with reference to the drawings. It should be understood that the exemplary embodiments described below are only part of the embodiments of this disclosure, rather than all of them. Besides, in the description of the specification of the present application, expressions such as "an embodiment", "some embodiments", "exemplary embodiments", "specific examples" or "some examples" are intended to mean that specific features, structures, materials or characteristics described with reference to the embodiments or examples are contained in at least one embodiment or example of this disclosure. Therefore, schematic descriptions with respect to the above expressions do not have to be directed at the same embodiments or examples herein. Instead, specific features, structures, materials or characteristics described thereby can be combined in a suitable manner in any one or more embodiments or examples. Besides, where no contradiction is caused, those skilled in the art can combine and assemble different embodiments or examples described in the specification and features of different embodiments or examples.

It should be understood that, in the description of this disclosure, directional or positional relations indicated by directional terms such as "center", "up", "down", "front", "back", "left", "right", "vertical", "horizontal", "top", "bottom", "inner", "outer" and the like are directional or positional relations shown on the basis of the drawings. They are used only for describing the exemplary embodiments of this disclosure, instead of indicating that the described devices or elements must be orientated specifically, or constructed and operated in a specific orientation, so they cannot be construed as limiting this disclosure.

It should be noted that in the description of this disclosure, unless otherwise prescribed and defined explicitly, terms such as "mount", "link" and "connect" should be understood in a broad sense. For example, "connect" may refer to fixed connection, or detachable connection, or integrated connection. For a person having ordinary skills in the art, the specific meanings of the above terms in the exemplary embodiments of this disclosure can be understood upon specific situations. Besides, it should be understood that when an element is described as being "connected to another element" or "coupled to another element", it can be connected or coupled to another element directly, or there can be an intermediate element. In contrast, when an element is described as being "directly connected to another element" or "directly coupled to another element", there is no intermediate element.

It will be understood that although terms such as "first", "second" and the like can be used for describing various elements, components and/or parts herein, the elements, components and/or parts should not be limited by these terms. These terms are only used for distinguishing an element, a component or a part from another element, another component or another part. Therefore, the first element, component or part discussed below may also be referred as second or third element, component or part without deviating from the teaching of this disclosure. In the description of this disclosure, unless otherwise explained, the wording "multiple" means two or more.

The terms used herein are used only for describing specific embodiments rather than limiting this disclosure. As used herein, the singular forms of "one", "a" and "the" are intended to include the plural forms too, unless explicitly indicated otherwise in the context. It should also be understood that when used in this specification, the terms of "comprise" and/or "include" refer to the presence of features, entireties, steps, operations, elements and/or components that are mentioned, but do not exclude the presence or the addition of one or more other features, entireties, steps, operations, elements, components and/or groups thereof.

Moreover, the term of "and/or" herein comprises any and all combination of one or more of the listed items that are associated.

Unless otherwise defined, all terms (including technical terms and scientific terms) used herein have the same meaning as commonly understood by one having ordinary skills in the art. It should also be understood that terms such as those defined in a common dictionary should be construed as having the same meaning as in the related art and/or in the context of this specification, and will not be construed in an ideal or overly formal sense, unless defined explicitly as such herein.

Steps comprised in the method described in this disclosure are exemplary, and they do not have to be executed in the listed sequence, but instead one or more of the steps can be executed in a difference sequence or simultaneously upon actual situations. Besides, the described method may also comprise other additional steps upon actual situations.

Some techniques, structures and materials commonly known in the art of this disclosure are not described in detail for clarity so as to avoid making the present application tediously long.

FIG. 1 schematically shows a reflective sheet 1 in the prior art, comprising a central portion 2, four side portions 3 and four connection portions 4. The four side portions 3 are arranged around the central portion 2 and each side portion 3 is integrated with the central portion 2. The four side portions 3 are all bendable relative to the central portion 2 such that a fold line can be formed between each side portion 3 and the central portion 2. The four connection portions 4 are also arranged around the central portion 2 and interspersed alternately with the four side portions 3 such that each connection portion 4 is adjacent to two side portions 3. Each connection portion 4 of the four connection portions 4 is integrated with a side portion 3 of the two adjacent side portions 3 on one side, and naturally laps over the other side portion 3 of the two adjacent side portions 3 on the other side. The central portion 2, the four side portions 3 and the four connection portions 4 together form a light mixing chamber 5. Moreover, the central portion 2 further comprises a plurality of mounting holes 6 for mounting a light source.

Figure 2:
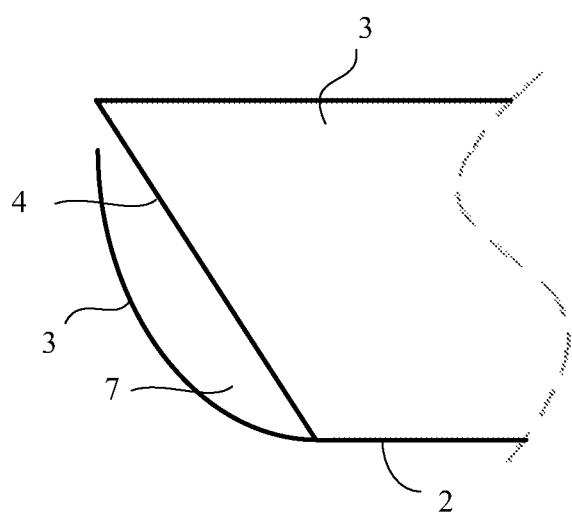
FIG. 2 is a partial section view of the reflective sheet in the prior art shown in FIG. 1, taken along line M-M in FIG. 1.

Referring to FIG. 2, it is a partial section view taken along line M-M of FIG. 1, which shows a connection portion 4 and two side portions 3 adjacent thereto in the reflective sheet 1. As shown in FIG. 2, the side portion 3 of the two side portions 3 lapping over the connection portion 4 is deformed by an external force. The deformation causes misalignment of the connection portion 4 and the deformed side portion 3 at the lap joint, thereby resulting in a gap 7. The reflective sheet 1 will leak light at the gap 7 and thus form a shadow there, which will affect the brightness uniformity of the backlight module and the quality of the display image of the liquid crystal display device to some extent.

Figure 3:
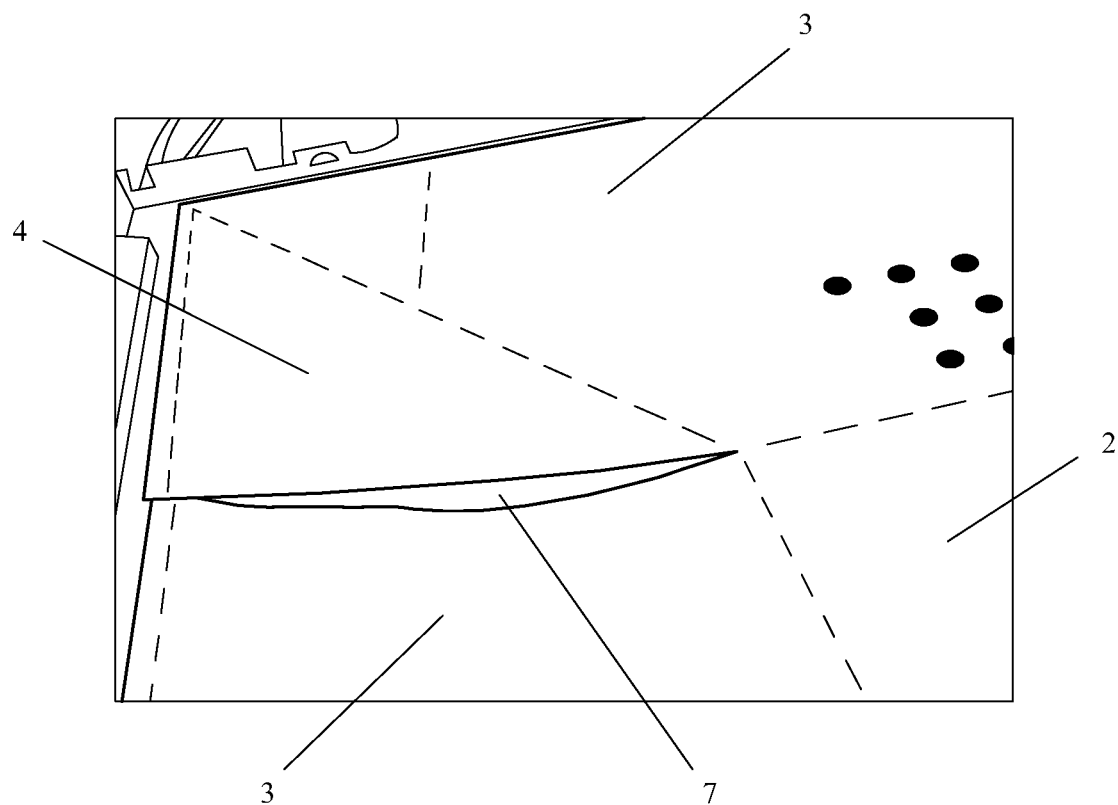
FIG. 3 is a schematic view of a part of the reflective sheet in the prior art shown in FIG. 1, wherein a gap occurring between a side portion and a connection portion is shown.

Referring to FIG. 3, in which an image of a part of the reflective sheet 1 in the prior art shown in FIG. 1 is given. The picture shows a connection portion 4 and two side portions 3 adjacent thereto. The side portion 3 of the two side portions 3 lapping over the connection portion 4 has been deformed, and the deformation causes misalignment of the connection portion 4 and the deformed side portion 3 at the lap joint, thereby resulting in a gap 7.

Figure 4:
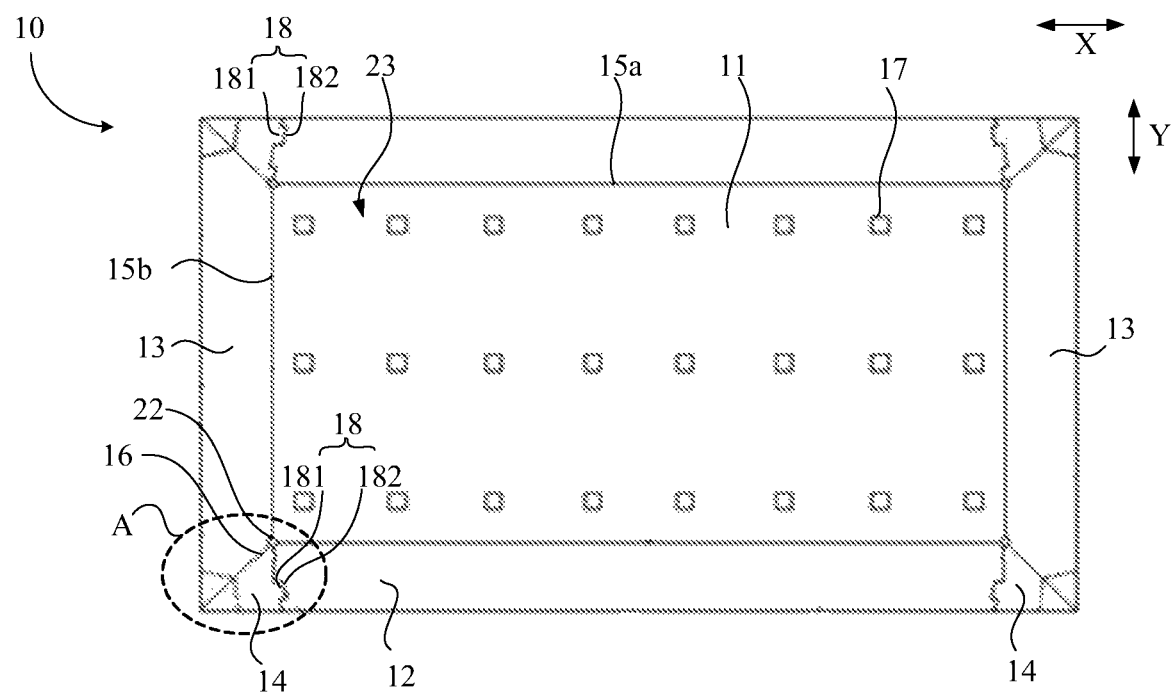
FIG. 4 is a schematic structure view of the reflective sheet according to an exemplary embodiment.

Now referring to FIG. 4, a reflective sheet 10 according to an exemplary embodiment is schematically shown. As shown in FIG. 4, the reflective sheet 10 comprises a central portion 11, two first side portions 12, two second side portions 13 and four connection portions 14. The two first side portions 12 and the two second side portions 13 are all arranged around the central portion 11, and each of the side portions 12, 13 is integrated with the central portion 11. The two first side portions 12 are arranged oppositely in parallel with each other and extend in a first direction X. The two second side portions 13 are also arranged oppositely in parallel with each other and extend in a second direction Y. The first direction X is perpendicular to the second direction Y. The two first side portions 12 and the two second side portions 13 are all bendable relative to the central portion 11 such that first fold lines 15a can be formed between the first side portions 12 and the central portion 11, and second fold lines 15b can be formed between the second side portions 13 and the central portion 11. In the exemplary embodiment shown in FIG. 4, the first and second fold lines 15a, 15b are connected sequentially and form a rectangular shape. It can be easily understood that in a further exemplary embodiment, the first and second fold lines 15a, 15b may also form a square shape. The four connection portions 14 are also arranged around the central portion 11 and interspersed alternately with the first and second side portions 12, 13 such that each connection portion 14 is arranged between a first side portion 12 and a second side portion 13. The connection portion 14 is integrated with the second side portion 13 on one side and fixedly connected to the first side portion 12 on the other side. The connection portion 14 is bendable relative to the second side portion 13 such that a bend line 16 is formed at the junction of the connection portion 14 and the second side portion 13. The central portion 11 of the reflective sheet 10 further comprises a plurality of mounting holes 17, and the mounting holes 17 may be used for mounting a light source.

It should be understood that in some exemplary embodiments, the reflective sheet may also comprise, upon actual needs, less side portions, e.g., three side portions, or more side portions, e.g., five or six side portions, as long as the fold lines formed between these side portions and the central portion can be connected sequentially and form an enclosed shape. Correspondingly, in these cases, the reflective sheet may comprise three, five or six fold lines, and three, five or six connection portions.

Referring again to FIG. 4, the purpose of integrating each connection portion 14 of the reflective sheet 10 with the second side portion 13 on one side is to enable a smooth transition of the connection portion 14 at the junction with the second side portion 13 and avoid forming seams at the junction of the connection portion 14 and the second side portion 13, thereby preventing light leakage at the junction of the connection portion 14 and the second side portion 13. Meanwhile, each connection portion 14 is fixedly connected to the first side portion 12 on the other side. The fixed connection is implemented such that the connection portion 14 is substantially located in the same plane as the first side portion 12 so as to ensure a generally smooth transition of the surfaces of the connection portion 14 and the first side portion 12 at the junction. In the reflective sheet 10 shown in FIG. 4, the connection portion 14 is fixedly connected to the first side portion 12 via clamping structures 18. However, it can be easily understood that in some exemplary embodiments, the connection portion may also be fixedly connected to the first side portion by other means, which will be described below.

After the reflective sheet 10 shown in FIG. 4 is manufactured, when subjected to an external force (e.g., at least one of the first side portion 12, the second side portion 13, and the connection portion 14 is subjected to its own gravity or is pressed), since the connection portion 14 is integrated with the second side portion 13 on one side and fixedly connected to the first side portion 12 via the clamping structures 18 on the other side, which firmly fastens them together, no relative movement or misalignment will occur at the clamping joint of the connection portion 14 and the first side portion 12, and thus no gap will be formed between the connection portion 14 and the first side portion 12. Therefore, the connection portion 14 of the reflective sheet 10 and the corresponding first side portion 12 will not leak light at the clamping joint, which can greatly decrease light leakage positions on the reflective sheet 10 and significantly reduce shadows on the reflective sheet 10, thereby advantageously improving the brightness uniformity of the backlight module and the quality of the display image of the liquid crystal display device. Furthermore, as shown in FIG. 4, when the junction of the connection portion 14 and the first side portion 12 is close to the bend line 16, since the connection portion 14 is clamped with the first side portion 12 via the clamping structures 18, light leakage in the vicinity of corners of the reflective sheet 10 may be avoided and shadows in corners of the reflective sheet 10 may be reduced.

It should be pointed out that in the above exemplary embodiments, the clamping structures 18 may have various forms, e.g., the clamping structures 18 may be the following shape-complementary structures: as shown in FIG. 4, the clamping structures 18 may comprise a protrusion portion 181 formed at an edge of the connection portion 14, and a corresponding recess portion 182 formed at an edge of the first side portion 12, wherein the protrusion portion 181 and the recess portion 182 can be clamped with each other in complementary shapes such that the connection portion 14 and the first side portion 12 are fixedly connected with each other. It can be easily understood that in a further exemplary embodiment, the protrusion portion may also formed on an edge of the first side portion 12, and the recess portion may also formed on an edge of the connection portion 14. The clamping structures 18 may also be shape-complementary structures in other forms, for example, without limitation, a first sawtooth structure formed at an edge of the connection portion 14, and a second sawtooth structure formed at an edge of the first side portion 12, and vice versa. The clamping structures 18 may also be the following structures: the clamping structures 18 may comprise an elastic clamping claw arranged in the first side portion 12 and a clamping hole arranged in the connection portion 14, wherein the elastic clamping claw and the clamping hole are clamped with each other such that the connection portion 14 and the first side portion 12 are fixedly connected with each other. As compared with the exemplary embodiment in which the clamping structures 18 comprise an elastic clamping claw and a clamping hole, in the exemplary embodiment in which the clamping structures 18 comprise clamping structures having complementary shapes, since the first and second shape-complementary structures are respectively formed on the connection portion 14 and the first side portion 12, they can be formed by removing materials from the connection portion 14 and the first side portion 12 respectively. The manufacture process is simple, and no new parts are required to be added on the connection portion 14 and/or the first side portion 12, so the manufacture costs can be reduced. Besides, implementing engagement by shape-complementary structures can greatly increase the friction at the junction of the connection portion 14 and the first side portion 12, which makes them less prone to relative movement or misalignment. It should be understood that the connection portion 14 may also be fixedly connected to the first side portion 12 by any other suitable means, e.g., bonding.

As shown in the exemplary embodiment of FIG. 4, the first side portion 12 can be clamped with two connection portions 14 respectively at both ends thereof via the clamping structures 18, such that the two connection portions 14 are both fixed relative to the first side portion 12. It is also possible to clamp one connection portion 14 with the first side portion 12 via the clamping structures 18 while the other connection portion 14 still keeps lapping over the first side portion 12. As compared with the exemplary embodiment in which one connection portion 14 is clamped with the first side portion 12 via the clamping structures 18 while the other connection portion 14 laps over the first side portion 12, in the exemplary embodiment in which both connection portions 14 are clamped with the first side portion 12 via the clamping structures 18, the first side portion 12 may be fixedly connected with the connection portions 14 at both ends, which avoids light leakage at the junctions of the first side portion 12 and the two connection portions 14, thereby greatly decreasing light leakage positions on the reflective sheet 10 and significantly reducing shadows on the reflective sheet 10.

As shown in FIG. 4, for each first side portion 12, the two connection portions 14 are respectively located on both ends of the first side portion 12 in the first direction X, and the two connection portions 14 are integrated with corresponding second side portions 13 respectively. In a further exemplary embodiment, it is also possible to clamp one first side portion 12 with two connection portions 14 while the other first side portion 12 is integrated with two connection portions 14 corresponding thereto, with both ends thereof being directly connected to the corresponding second side portions 13. As compared with the embodiment in which one first side portion 12 is clamped with two connection portions 14 while the other first side portion 12 is integrated with two connection portions 14 corresponding thereto, in the embodiment in which each first side portion 12 is clamped with two connection portions 14, the reflective sheet 10 can be easily transformed from a planar structure to a three-dimensional structure, and at the same time, gaps can be avoided in four corners of the reflective sheet 10, i.e., at four junctions of two first side portions 12 and two second side portion 13, and thus light leakage can be avoided in four corners of the reflective sheet 10, which can greatly decrease light leakage positions on the reflective sheet and in turn significantly reduce shadows on the reflective sheet 10.

Figure 5:
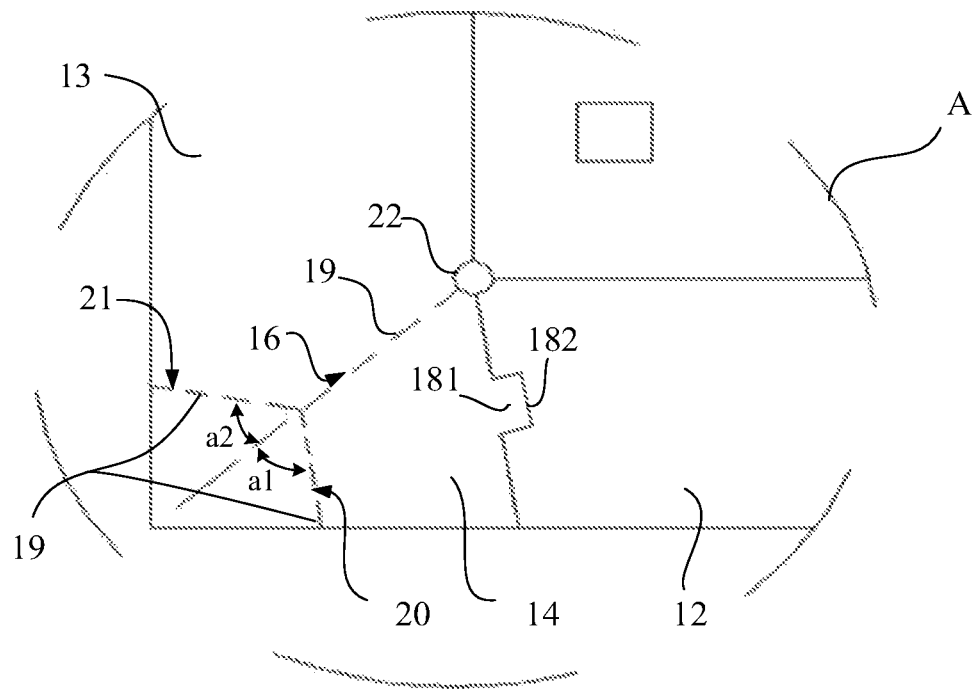
FIG. 5 is an enlarged partial view of A in FIG. 4.

Referring to FIG. 5, an enlarged partial view of A in FIG. 4 is shown. As shown in FIG. 5, a bend line 16 is formed at the junction of the connection portion 14 and the second side portion 13, and a plurality of slits 19 can be provided on the bend line 16 at intervals. The plurality of slits 19 on the bend line 16 not only can release the stress in the corners of the reflective sheet 10, but also can improve the resistance of the corners of the reflective sheet 10 (i.e., the part where the connection portion 14 connects with the second side portion 13) against bending and deformation perpendicular to the bend line 16, which can enhance the strength of the corners of the reflective sheet 10 and in turn ensure structural stability of the corners of the reflective sheet 10.

In order to further raise the structural stability of the corners of the reflective sheet 10, as shown in FIG. 5, a first line 20 can be provided on the connection portion 14, and a second line 21 can be provided on the second side portion 13. Both the first line 20 and the second line 21 intersect the bend line 16, and both the first line 20 and the second line 21 are formed by a plurality of slits 19 arranged at intervals.

By providing a first line 20 and a second line 21 on both sides of the bend line 16, not only can the stress in the corners of the reflective sheet 10 be further released, but also the resistance of the corners of the reflective sheet 10 against bending and deformation perpendicular to the first line 20 and the second line 21 can be improved, which can further enhance the strength of the corners of the reflective sheet 10 and in turn make the structures of the corners of the reflective sheet 10 more stable. In some exemplary embodiments, apart from the first line 20 and the second line 21, at least one slit 19 may also be arranged on at least one of the bend line 16, the first fold line 15a and the second fold line 15b in order to release the stress accumulated in these parts of the reflective sheet 10, thereby ensuring structural stability of the reflective sheet 10. The arrangement position and the number of the slits 19 on the bend line 16, the first fold line 15a and the second fold line 15b can be determined upon actual needs, which will not be limited in this disclosure.

The first line 20 and the second line 21 are both straight lines, and extending respectively towards the edges of the reflective sheet 10. A first angle a1 is formed between the bend line 16 and the first line 20, and a second angle a2 is formed between the bend line 16 and the second line 21. The first and second angles a1 and a2 may be greater than 0° and smaller than or equal to 90°. After research, it is found that when the first and second angles a1 and a2 formed between the bend line 16 and each of the first line 20 and the second line 21 fall within the range of 30°~70°, the resistance of the corners of the reflective sheet 10 against bending and deformation can achieve a better effect, and the corners of the reflective sheet 10 can have a greater strength, which ensures that the structures of the corners of the reflective sheet 10 are more stable.

It should be pointed out that apart from straight line, the first line 20 and/or the second line 21 may also be curves, or a combination of curves and straight lines, which will not be specifically limited in this disclosure.

The arrangement of the first line 20 and the second line 21 is not unique. For example, referring to FIG. 4 and FIG. 5, the first line 20 and the second line 21 may be arranged symmetrically with respect to the bend line 16, i.e., the first angle a1 formed between the first line 20 and the bend line 16 and the second angle a2 formed between the second line 21 and the bend line 16 are equal. However, in some exemplary embodiments, the first line 20 and the second line 21 may also be arranged asymmetrically with respect to the bend line 16, i.e., the first angle a1 formed between the first line 20 and the bend line 16 and the second angle a2 formed between the second line 21 and the bend line 16 are not equal. As compared with the asymmetrical arrangement with respect to the bend line 16, in case of the symmetrical arrangement of the first line 20 and the second line 21 with respect to the bend line 16, not only can the formation of the first line 20 and the second line 21 be facilitated, but also the corners of the reflection sheet 10 can be more uniformly stressed when the corners of the reflection sheet 10 are subjected to external forces, which ensures that the two sides of the bend line 16 are deformed in the same way, avoids a larger deformation on one side and a smaller deformation on the other side, and thereby further ensures the structural stability of the corners of the reflection sheet 10.

As shown in FIG. 4 and FIG. 5, the first fold line 15a and the second fold line 15b formed between the first side portion 12 and the central portion 11 and between the second side portion 13 and the central portion 11, may intersect the bend line 16 at a point. During the transformation of the reflective sheet 10 from being planar to being three-dimensional, materials in some regions of the reflective sheet 10 will be redundant, e.g., at the intersection of the bend line 16 with the first and second fold lines 15a, 15b, such that not only are the redundant materials of the reflective sheet 10 prone to interference at the intersection of the first and second fold lines 15a, 15b with the bend line 16, but also the local stress in this part is increased. In order to solve this problem, as shown in FIG. 4 and FIG. 5, a through hole 22 may be provided at the intersection of the first and second fold lines 15a, 15b with the bend line 16. By providing a through hole 22, the redundant materials at the intersection of the first and second fold lines 15a, 15b with the bend line 16 are removed such that not only can the stress of the reflective sheet 10 at the interface of the central portion 11 with the first side portion 12 and the second side portion 13 be released, but also the interference of the redundant materials of the reflective sheet 10 at the intersection of the first and second fold lines 15a, 15b with the bend line 16 can be avoided, which prevents the first side portion 12 from pulling up the connection portion 14 and the second side portion 13 when bent relative to the central portion 11, and thus ensures a smooth transformation of the reflective sheet 10 from a planar structure to a three-dimensional structure.

In some exemplary embodiments, the through hole 22 may have a diameter of 3 mm-6 mm. In the reflective sheet 10 provided according to an exemplary embodiment of this disclosure, the connection line of the connection portion 14 and the first side portion 12 may (e.g., as shown in FIG. 3 and FIG. 4) or may not intersect the through hole 22, which will not be specifically limited in this disclosure.

In the reflective sheet 10 provided according to an exemplary embodiment, apart from being integrated with the central portion 11, the first side portion 12 and the second side portion 13 may also be designed separately and then connected with the central portion 11 by bonding.

Figure 6:
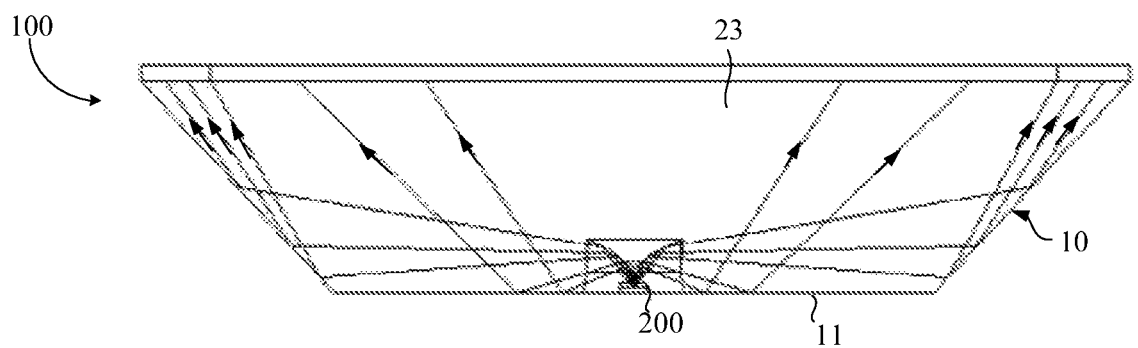
FIG. 6 is a schematic structure view of the backlight module according to an exemplary embodiment.

Referring to FIG. 6, a backlight module 100 is schematically shown. The backlight module 100 comprises a light source 200 and the reflective sheet 10 according to the exemplary embodiment shown in FIG. 4. The light source 200 is arranged on the central portion 11 of the reflective sheet 10 and located within the light mixing chamber 23 of the reflective sheet 10. The backlight module 200 may further comprise a diffusion plate and a film arranged to cover the light mixing chamber 23. Besides, as desired, one or more optical support posts may be arranged within the light mixing chamber 23 so as to provide support for the diffusion plate and the film.

In an exemplary embodiment, the light source 200 may comprise one or more LED beads. The light source 200 may be mounted with such a structure: as shown in FIG. 4, the mounting holes 17 are provided on the central portion 11. During the mounting, a circuit board for driving the light source 200 is fixed on the central portion 11 of the reflective sheet 10 and located outside the light mixing chamber 23 of the reflective sheet 10, and the bead(s) of the light source 200 is(are) located inside the light mixing chamber 23 through the mounting hole(s) 17.

The backlight module 100 shown in FIG. 6 comprises the reflective sheet 10 shown in FIG. 4, so the backlight module 100 shown in FIG. 6 can also solve the same technical problem and achieve the same technical effects. As for other structures contained in the backlight module 100, they have been well known for those skilled in the art, which will not be repeated herein for conciseness.

Figure 7:
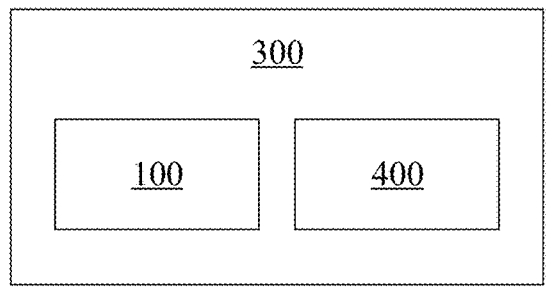
FIG. 7 is a block diagram of the liquid crystal display device according to an exemplary embodiment.

Referring to FIG. 7, a block diagram of the liquid crystal display device 300 according to an exemplary embodiment is schematically shown. The liquid crystal display device 300 comprises the backlight module 100 shown in FIG. 6, and a suitable liquid crystal display panel 400. It can be easily understood that the liquid crystal display device 300 can be a liquid crystal display device such as a liquid crystal television or a computer display, which adopts a direct type backlight module. As for other structures of the liquid crystal display device, they have been well known for those skilled in the art, which will not be repeated herein for conciseness.

Figure 8:
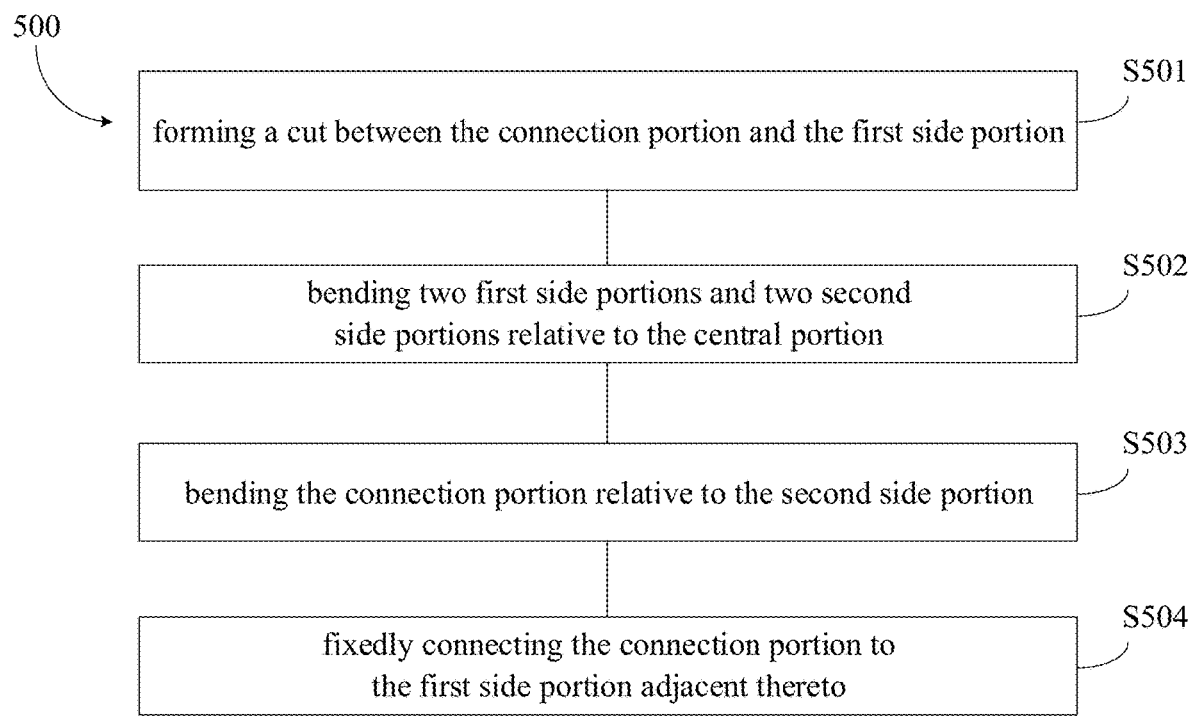
FIG. 8 is a flow chart of a method for manufacturing the reflective sheet according to an exemplary embodiment.

Referring to FIG. 8, a method 500 for manufacturing the reflective sheet 10 according to the exemplary embodiment shown in FIG. 4 is schematically shown, comprising steps of:

S501: forming a cut between the connection portion 14 and the first side portion 12;

S502: bending two first side portions 12 and two second side portions 13 relative to the central portion 11;

S503: bending the connection portion 14 relative to the second side portion 13; and S504: fixedly connecting the connection portion 14 to the first side portion 12 adjacent thereto.

During the manufacture of the reflective sheet 10, the cut is usually formed in a planar reflective sheet 10 (the cut in the reflective sheet 10 may be formed with a cutting die in one cutting), and then a three-dimensional reflective sheet 10 is formed by bending. As shown in FIG. 4 and FIG. 5, after the formation of the three-dimensional reflective sheet 10, a bend line 16 is formed at the junction of the connection portion 14 and the second side portion 13, and a first fold line 15a and a second fold line 15b are formed respectively at the junctions of the first side portion 12 and the second side portion 13 with the central portion 11. The bend line 16 may intersect the corresponding first fold line 15a and the corresponding second fold line 15b at a point in a corner of the reflective sheet 10. In some embodiments, the method 500 may also comprise a step of forming at least a slit 19 on at least one of the first fold line 15a, the second fold line 15b and the bend line 16.

In some embodiments, the method 500 may also comprise steps of: forming a first line 20 on the connection portion 14; forming a second line 21 on the second side portion 13; wherein the first line 20 and the second line 21 are formed respectively by a plurality of slits 19 arranged at intervals. In some exemplary embodiments, the method 500 may also comprise a step of forming a through hole 22 at the intersection of the first fold line 15a, the second fold line 15b and the bend line 16.

What is described above is only a description of exemplary embodiments and explanation of the technical principles employed thereby. Those skilled in the art should understand that the scope of this disclosure is not limited by technical solutions formed by a specific combination of the above technical features, but instead, it should also cover other technical solutions formed by a random combination of the above technical feature or equivalent features without deviating from the technical principles. Besides, one having ordinary skills in the art can make various modifications and variations to the described exemplary embodiments of this disclosure without deviating from spirits of this disclosure, and these modifications and variations should also be regarded as falling within the scope of this disclosure. Therefore, the protective scope of this disclosure is limited only by the appended claims.

What is claimed:

1. A reflective sheet, comprising:
    a central portion, defined by four fold lines connected sequentially and enclosing the central portion;
    four side portions integrally coupled to the central portion by a corresponding one of the four fold lines, each side portion is bent relative to the central portion along the corresponding fold line;
    four connection portions, each connection portion being arranged between two adjacent of the four side portions, each connection portion being integrated with one of the two adjacent side portions, being bent relative to the one of the two adjacent side portions to form a bend line, and each connection portion being fixedly connected to the other of the two adjacent side portions;
    wherein the central portion, the four side portions and the four connection portions together form a light mixing chamber;
    wherein the four side portions comprise two first side portions arranged oppositely in parallel with each other and extending in a first direction, and two second side portions arranged oppositely in parallel with each other and extending in a second direction, wherein the first direction is perpendicular to the second direction;
    wherein the four fold lines comprise two first fold lines formed between the two first side portions and the central portion, and two second fold lines formed between the two second side portions and the central portion, wherein the two first fold lines are parallel with each other and extend in the first direction, and the two second fold lines are parallel with each other and extend in the second direction, and the two first fold lines and the two second fold lines together form a rectangular or square shape;
    wherein each connection portion is located between a first side portion and a second side portion, and connects the first side portion and the second side portion, wherein the connection portion is integrated with the second side portion and fixedly connected to the first side portion, and the bend line is formed between the connection portion and the second side portion; and
    wherein a first line is provided on the connection portion, and a second line is provided on the second side portion, and both the first line and the second line intersect the bend line, and the first line and the second line are formed respectively by a plurality of slits arranged at intervals.

2. The reflective sheet according to claim 1, wherein the connection portion is bonded to the first side portion.

3. The reflective sheet according to claim 1, wherein at least one of the bend line, the first fold line and the second fold line is provided with at least one slit.

4. The reflective sheet according to claim 1, wherein the first line and the second line are arranged symmetrically with respect to the bend line.

5. The reflective sheet according to claim 1, wherein at least one of the first line and the second line has a shape selected from the following group: straight line, curve and a combination thereof.

6. The reflective sheet according to claim 1, wherein the first line and the second line are straight lines and respectively extending towards the edges of the reflective sheet, a first angle is formed between the bend line and the first line, and a second angle is formed between the bend line and the second line, the first angle and the second angle are greater than 0° and smaller than or equal to 90°.

7. The reflective sheet according to claim 1, wherein the first line and the second line are straight lines and respectively extending towards the edges of the reflective sheet, a first angle is formed between the bend line and the first line, and a second angle is formed between the bend line and the second line, the first angle and the second angle are greater than or equal to 30° and smaller than or equal to 70°.

8. A method for manufacturing the reflective sheet according to claim 1, comprising:
    forming a cut between the connection portion and the first side portion adjacent thereto;
    forming the first line on the connection portion and forming the second line on the second side portion;
    bending the two first side portions and the two second side portions relative to the central portion;
    bending the connection portion relative to the second side portion; and
    fixedly connecting the connection portion to the first side portion adjacent thereto.

9. A backlight module, comprising the reflective sheet according to claim 1, and a light source arranged on the central portion of the reflective sheet and located within the light mixing chamber of the reflective sheet.

10. A liquid crystal display device, comprising a liquid crystal display panel; and the backlight module according to claim 9.

11. The reflective sheet according to claim 1, wherein the bend line intersects a corresponding vertex of the rectangle or the square.

12. The reflective sheet according to claim 11, wherein a through hole is arranged at the intersection of the bend line and the vertex.

13. The reflective sheet according to claim 12, wherein the through hole has a diameter of 3 mm-6 mm.

14. The reflective sheet according to claim 1, wherein the connection portion and the first side portion comprise clamping structures fixedly connecting them to each other.

15. The reflective sheet according to claim 14, wherein the clamping structures comprise an elastic clamping claw formed in one of the connection portion and the first side portion and a clamping hole formed in the other of the connection portion and the first side portion.

16. The reflective sheet according to claim 14, wherein the clamping structures comprise shape-complementary structures formed at adjacent edges of the connection portion and the first side portion.

17. The reflective sheet according to claim 16, wherein the shape-complementary structures comprise: a first sawtooth structure formed at an edge of the connection portion, and a second sawtooth structure formed at an edge of the first side portion, and the first sawtooth structure and the second sawtooth structure can be clamped with each other.

18. The reflective sheet according to claim 16, wherein the shape-complementary structures comprise:
    at least one protrusion portion formed at an edge of one of the connection portion and the first side portion, and at least one recess portion formed at an edge of the other of the connection portion and the first side portion;
    wherein the protrusion portion and the recess portion are complementary in shape.

* * * * *